United States Patent [19]

Kiyohara et al.

[11] Patent Number: 4,959,803

[45] Date of Patent: Sep. 25, 1990

[54] DISPLAY CONTROL SYSTEM

[75] Inventors: Toshimi Kiyohara, Nara; Toshiya Morita, Yamatokoriyama, both of Japan

[73] Assignee: Sharp Kabushiki Kaisha, Osaka, Japan

[21] Appl. No.: 210,855

[22] Filed: Jun. 24, 1988

[30] Foreign Application Priority Data

Jun. 26, 1987 [JP] Japan .............................. 62-160574

[51] Int. Cl.[5] .............................................. G06F 3/153

[52] U.S. Cl. .................................... 364/521; 364/518; 340/734; 340/750

[58] Field of Search ................ 364/518, 521; 340/726, 340/724, 703, 747, 750, 721, 734, 798, 799

[56] References Cited

U.S. PATENT DOCUMENTS

| | | | |
|---|---|---|---|
| 3,792,462 | 2/1974 | Casey et al. | 340/726 |
| 4,412,294 | 10/1983 | Watts et al. | 364/518 |
| 4,542,376 | 9/1985 | Bass et al. | 340/724 |
| 4,642,790 | 2/1987 | Minshull et al. | 364/900 |
| 4,692,757 | 9/1987 | Tsuhara et al. | 340/721 |
| 4,700,320 | 10/1987 | Kapur | 364/521 |
| 4,714,918 | 12/1987 | Barker et al. | 340/724 |
| 4,860,218 | 8/1989 | Sleator | 364/518 |

FOREIGN PATENT DOCUMENTS

| | | |
|---|---|---|
| 0153197 | 8/1985 | European Pat. Off. . |
| 0168144 | 1/1986 | European Pat. Off. . |
| 6177977 | 4/1986 | Japan . |

*Primary Examiner*—Gary V. Harkcom
*Assistant Examiner*—Phu K. Nguyen

[57] ABSTRACT

A display control system which includes a display memory having a serial access port for sending data to a display device and a random access port for data communication with a graphic drawing device. The system further includes a window buffer memory for storing image data such as sentences and graphic charts and a window controller for controlling the position of the window buffer memory content to be displayed on the display device. A selection circuit is included for selecting a display mode or a graphic drawing mode. During the display mode, the stored image data is transferred directly to the display device and overlaps the content of the display memory. During the graphic mode, the stored image data is transferred to the display memory under control of a graphic controller and is then displayed.

3 Claims, 5 Drawing Sheets

DISPLAY CONTROL SYSTEM

BACKGROUND OF THE INVENTION

This invention relates to a display control system.

Conventionally, image display is controlled by one of the following systems shown in FIGS. 5(*a*), (*b* ) and (*c*).

The display control system shown in FIG. 5(*a*) is a so-called software window system involving raster operation. In this system, the image data of the windows A, B and C stored in a window memory 1 are transferred in blocks to a display memory 2 through raster operation so that picture editing such as positioning and superposing of the windows A, B and C are performed in the display memory 2. After editing, the image data are read sequentially from the display memory 2 for multi-window display on a CRT 3.

The display control system shown in FIG. 5(*b*) is a so-called hardware window system involving a mapping table. In this system, the address of the image data corresponding to the current scanning position on a CRT 6 is output sequentially from a hardware mapping table 5 during scanning operation by the CRT 6, and the image data of the windows A, B and C stored in a window memory 4 are read in shared time according to the above address and output directly to the CRT 6 for multi-window display.

The display control system shown in FIG. 5(*c*) is a so-called software window system involving clipping. In this system, a picture is drawn in a display memory 8 using the code data for the image information of the windows A, B and C stored in a segment buffer 7 after clipping the code data of the image information outside the windows. The image data is then read sequentially form the display memory 8 for multi-window display on a CRT 9.

The above conventional display control systems of FIGS. 5(*a*), (*b*) and (*c*) have disadvantages.

The disadvantage of the display control system of FIG. 5(*a*) involving raster operation is as follows. The image data in the window memory 1 must be transferred in blocks to the display memory 2 to edit a picture in the display memory 2 before the picture is displayed on the CRT 3. This operation must be carried out every time the window is moved on the CRT 3. Therefore, the window cannot be moved quickly.

The disadvantage of the system of FIG. 5(*b*) involving a mapping table is as follows. The addresses of the image data in the window memory 4 are output sequentially from the mapping table 5 so that the image data stored at the addresses are read in shared time and displayed directly on the CRT 6. With this system, it is possible to move the window quickly. On the other hand, however, since graphic drawing in the window memory 4 is also performed in shared time, drawing speed is slow.

The disadvantage of the system of FIG. 5(*c*) involving clipping is as follows. The code data of unnecessary image data in the segment buffer 7 is removed by clipping before the code data of the image data stored in the segment buffer 7 is transferred for graphic drawing on the display memory 8 and displayed on the CRT 9. To move the window on the CRT 9, therefore, the system requires hardware for drawing graphics at a high speed on the display memory 8 from the code data stored in the segment buffer 7.

SUMMARY OF THE INVENTION

Accordingly, in view of the prior art technology described above, the object of the present invention is to provide an image display control system which incorporates the advantages of a system using raster operation and the advantages of a system using a mapping table, so that in the display mode it is possible to move the window on the display quickly while watching the screen and, in the graphic drawing mode it is possible to draw and edit graphics rapidly in the window memory, thus allowing the operator to edit a document at a high speed while watching the CRT screen.

Briefly described, in accordance with the present invention, a display control system comprises a display memory having a serial access port for sending data to a display device and a random access port for sending data to and receiving data from a graphic drawing device, a window buffer memory for storing image data such as sentences, figures and tables, a window controller for controlling the position of the window buffer memory content displayed on the display device, and a selection circuit for selecting a display mode in which the window buffer memory content is directly displayed in shared time on the display device or a graphic drawing mode in which image data is transmitted between the window buffer memory and the display memory or graphics are drawn on the window buffer memory without sharing time.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

To display window buffer memory content directly on a display device overlapping display memory content, a selection circuit is set for the display mode. Then, the operation timing of the window buffer memory is shared between the display cycle and the graphic drawing cycle, so that window buffer memory content is displayed directly over the display memory content on the screen of the display device as the position of the window buffer memory content displayed is controlled by a window controller. Thus, in the display mode, a window can be moved rapidly on the display screen. When window buffer memory content is not to be displayed directly on the display device, the selection circuit is set for the graphic drawing mode. Then, the operation timing of the window buffer memory is used solely for the graphic drawing cycle so that graphics are drawn and edited in the window buffer memory and display memory. Accordingly, in the graphic drawing mode, it is possible to draw graphics and edit display data in the window buffer memory and display memory at a high speed.

Figure 1:
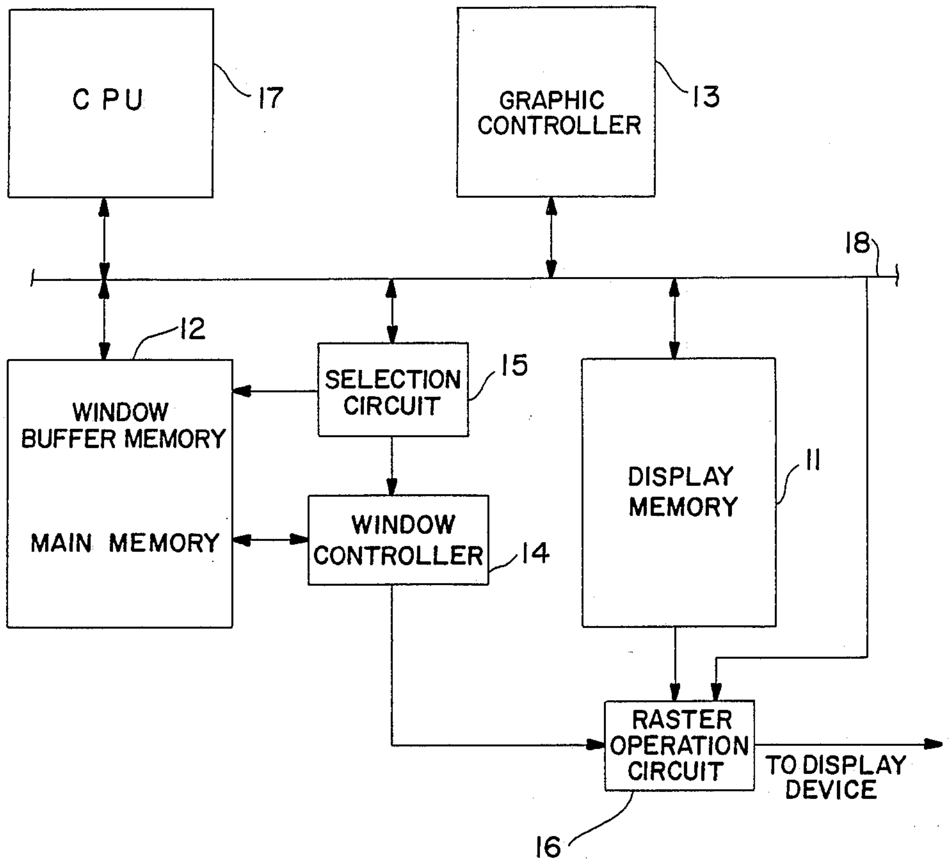
FIG. 1 is a block diagram of an embodiment of the present invention.

FIG. 1 is a block diagram of an embodiment of the present invention. A display memory 11 is a bit map memory for display having memory elements corresponding to the picture elements on the display device,. The display memory 11 is provided with a serial access port for sending data to the display device and a random access port for data communication with a graphic drawing device.

A window buffer memory 12 is designed to store image data such as sentences, figures and tables. In this embodiment, the window buffer memory 12 also serves as a main memory for effective use of the memory. This feature has a demerit that a CPU 17 cannot make access to the main memory while a graphic controller 13 is making access to the window buffer memory 12. On the other hand, however, this feature permits the effective use of the window buffer memory 12 whose capacity increases with the amount of image data to be displayed. The graphic controller 13 transmits image data between the window buffer memory 12 and the display memory 11 via a bus line 18 or draws graphics on both memories.

A window controller 14 allows the content of the window buffer memory 12 to be displayed directly with no intervention of the display memory 11, at a desired position overlapping the content of the display memory 11 on the display screen. This display position control is achieved by writing the status related to display in the register in the window controller 14. A selection circuit 15 selects the display mode in which the content of the window buffer memory 12 is displayed directly on the display device or the graphic drawing mode in which the window buffer memory content is not displayed on the display device. When the display mode is selected, the operation timing of the window buffer memory 12 is shared between the display cycle in which the window controller 14 makes access to the window buffer memory 12 and the graphic drawing cycle in which the graphic controller 13 makes access to the window buffer memory 12 via the bus line 18. When the graphic drawing mode is selected, the operation timing of the window buffer memory 12 is used only by the graphic drawing cycle so that the window buffer memory 12 is used 100% by the graphic controller 13. A raster operation circuit 16 sends image data output from the display memory 11 and image data output from the window controller 14 to the display device such as a CRT after logical operation.

Figure 2:
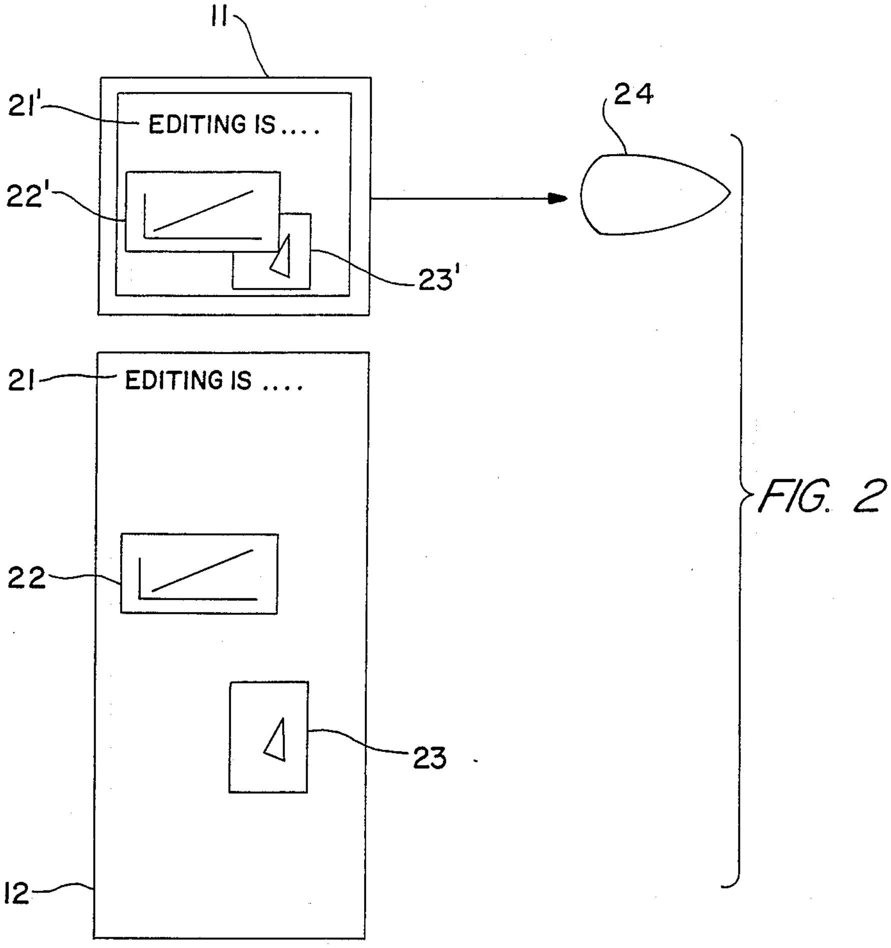
FIG. 2 is a chart for explaining the document editing by the embodiment of FIG. 1.

In the following description of the operation of the present embodiment, it is assumed that the window buffer memory 12 has stored the image data of sentences 21, a graphic chart 22 and a FIG. 23 as shown in FIG. 2.

When the operator is to move the graphic chart 22 and the FIG. 23 to appropriate positions overlapping the sentences 21 on the display screen of the CRT 24 in real time while watching the picture on the screen and, draw the image data with the graphic chart 22 and the FIG. 23 fixed at their most appropriate positions, on the display memory 11, he operates the system as follows.

(A) Transfer of the image data of the sentences 21 from the window buffer memory 12 to the display memory 11

The selection circuit 15 is set to the graphic drawing mode so that the operation timing of the window buffer memory 12 is used for graphic drawing cycle alone. With this setting, the display memory 11 which is a two-port memory can use about 97% of the cycle time for transferring image data while the window buffer memory 12 can use 100% of the cycle time for transferring image data. Accordingly, image data can be transferred in blocks at a high speed by the graphic controller 13. As a result, the image data of the sentences 21 in the window buffer memory 12 is transferred to the display memory 11 at a high speed.

(B) Positioning of the graphic chart 22 and the FIG. 23 with respect to the sentences 21

To enable the operator to move the graphic chart 22 and the FIG. 23 in real time while watching the picture on the CRT 24, the selection circuit 15 is switched over to the display mode so that the operation timing of the window buffer memory 12 is shared between the display cycle and the graphic drawing cycle. In the display cycle, the window controller 14 accesses the address of the window buffer memory 12 calculated according to the display status written in the internal register to read the image data of the graphic chart 22 or FIG. 23 and outputs the image data directly to the raster operation circuit 16 rapidly with no intervention of the display memory 11. Meanwhile, the image data of the sentences 21 already transferred from the window buffer memory 12 is output through the serial access port of the display memory 11. The raster operation circuit 16 executes logical operation for the image data of the sentences 21 output from the display memory 11 and for the image data of the graphic chart 22 and the FIG. 23 output from the window buffer memory 12, and outputs the image data of the graphic chart 22 and FIG. 23 overlapping the sentences 21 to the CRT 24. At this time, the display positions of the graphic chart 22 and the FIG. 23 can be changed quickly by changing the display status written in the register of the window controller 14.

Since the operation timing of the window buffer memory 12 is time shared between the graphic drawing cycle and display cycle, it is possible to draw graphics in the window buffer memory 12 when the operation timing is for the graphic drawing cycle. It must be noted, however, that the graphic drawing speed in this mode is slower than that in the graphic drawing mode (in which the operation timing is used only for the graphic drawing cycle).

(C) Transfer of the graphic chart 22 and FIG. 23 to the display memory 11

When the graphic chart 22 and the FIG. 23 have been positioned on the display screen of the CRT 24, the selection circuit 15 is switched over to the graphic drawing mode so that the operation timing of the window buffer memory 12 can be used solely for the graphic drawing cycle. Then, the image data of the graphic chart 22 and FIG. 23 thus positioned is transferred at a high speed from the window buffer memory 12 to the specified address in the display memory 11 under the control by the graphic controller 13. As a result, the image data for a picture with a graphic chart 22' and a FIG. 23' overlapping with sentences 21' as shown in FIG. 2 is formed in the display memory 11.

According to the above embodiment of the invention, as mentioned above, the display mode or the graphic drawing mode is selected by the selection circuit 15. In the display mode, the operation timing of the window buffer memory 12 is time shared between the display cycle and the graphic drawing cycle so that the window controller 14 transfers the content of the window buffer memory 12 directly to the CRT 24, presenting an active window display at a high speed. In the graphic drawing mode, the operation timing of the window buffer memory 12 is used for the graphic drawing cycle alone so that data drawing and editing in the window buffer memory 12 can be conducted rapidly. As a result, the operator can edit documents rapidly while watching the picture on the CRT 24.

Figure 3:
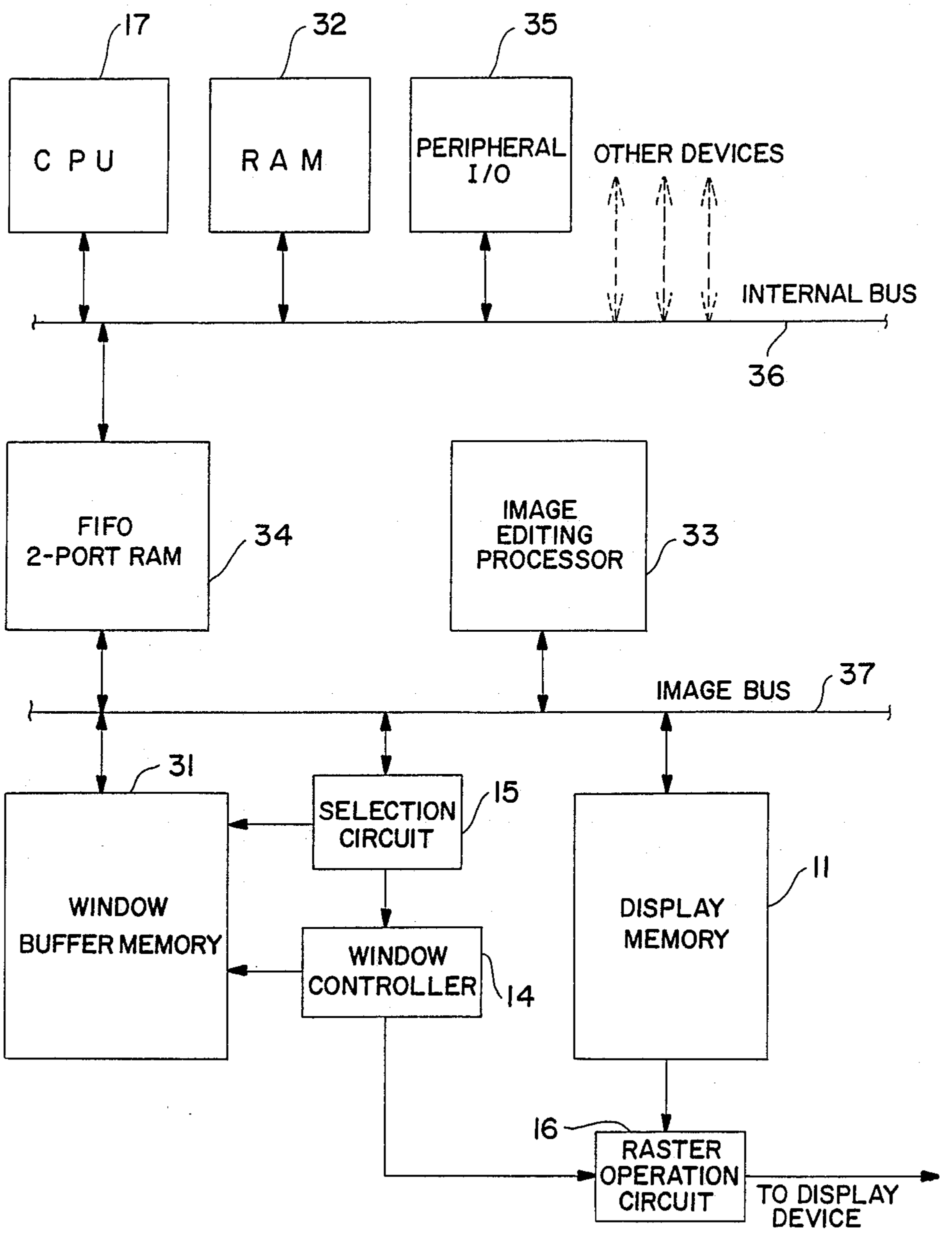
FIG. 3 is a block diagram of another embodiment of the present invention.

FIG. 3 shows another embodiment in which a window buffer memory 31 is used only for storing image data and a RAM (random access memory) 32 is provided separately as a main memory. The bus lines comprise an image bus 37 for transmitting image data and an internal bus 36. The window buffer memory 31, the selection circuit 15, the window controller 14, the display memory 11 and an image editing processor 33 are connected with the image bus 37. A FIFO two-port RAM 34 is connected between the image bus 37 and the internal bus 36. The image bus 37 or the internal bus 36 is selected by the FIFO two-port RAM 34 to present an image display at a high speed.

Figure 4:
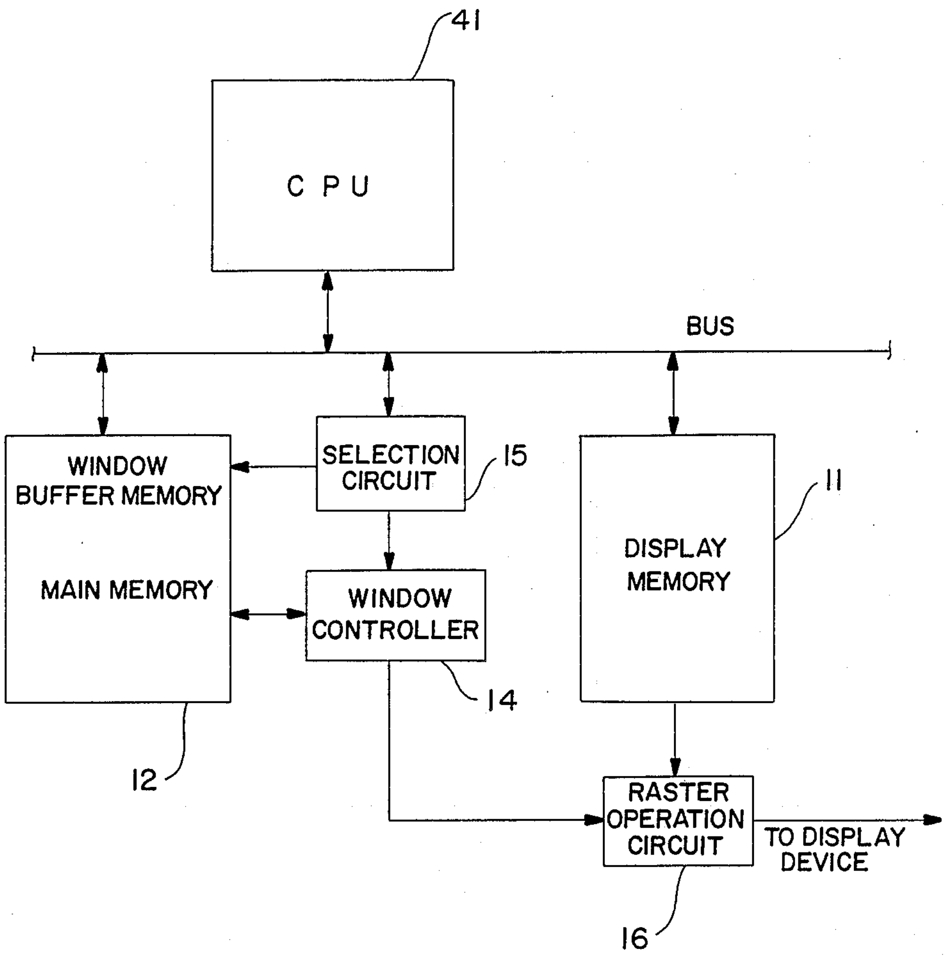
FIG. 4 is a block diagram of still another embodiment of the present invention.
Figure 5A:
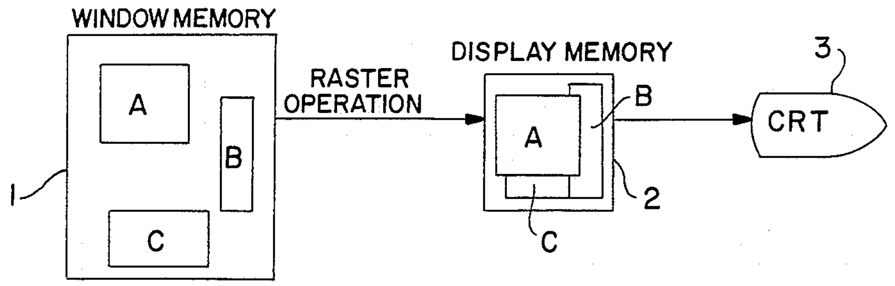
FIGS. 5(*a*)-(*c*) illustrates charts which explain the conventional display control systems.
Figure 5B:
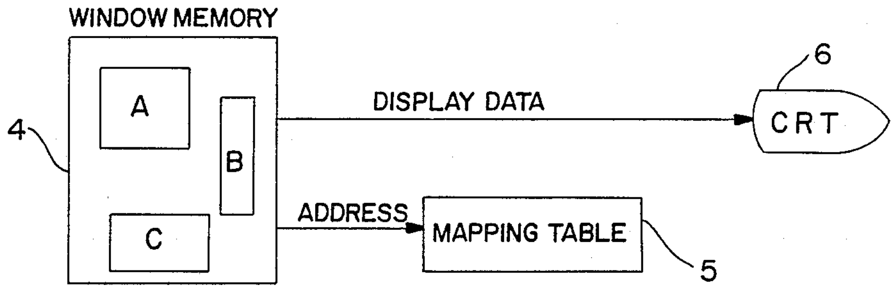
Figure 5C:
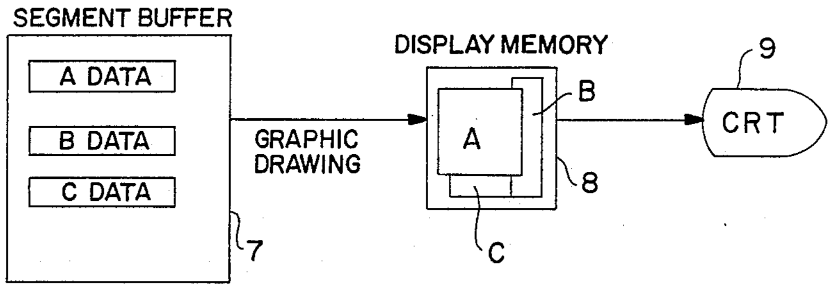

FIG. 4 shows still another embodiment of the invention in which image data transfer between the window buffer memory 12 and the display memory 11 or graphic drawing in the window buffer memory 12 or the display memory 11 is executed by a CPU 41.

According to the present invention, as understood from the above, the display control system comprises a display memory having a random access port and a serial access port, a window buffer memory for storing image data, a window controller for controlling the position of the window buffer memory content displayed on a display device, and a selection circuit for setting the operation mode of the window buffer memory to the display mode or to the graphic drawing mode. When the display mode is selected, the window buffer memory content is presented directly on the display device in shared time as the position of the data displayed is controlled by the window controller. When the graphic drawing mode is selected, image data transmission between the window buffer memory and the display memory or graphic drawing in the window buffer memory is conducted without time sharing. Consequently, it is possible for an operator to move a window at a high speed while watching the picture on the CRT when the selection circuit is switched over to the display mode, and to draw and edit graphics in the window buffer memory at a high speed when the selection circuit is switched over to the graphic drawing mode. As a result, it is possible to edit a document acitvely and rapidly while watching the picture on the display device.

While only certain embodiments of the present invention have been described, it will be apparent to those skilled in the art that various changes and modifications may be made therein without departing from the spirit and scope of the present invention as claimed.

What is claimed is:

1. A display system comprising:

a display;

display bit-map memory means for storing memory elements corresponding to picture elements of said display;

window buffer memory means for storing image data comprising sentences, graphics and charts to be displayed on said display;

transfer control means coupled to said window buffer memory means and said display bit-map memory means for controlling transfer of said stored image data from said window buffer memory means to said display bit-map memory means; and selection means coupled to said display bit-map memory means for allowing a user to select for operation one of a display mode or a writing mode, wherein said display system, in response to said selection means, is operable in said display mode wherein said stored image data is directly transferred to said display and displayed overlapping said stored memory elements and is operable in said writing mode wherein said stored image data is transferred by said transfer control means to said display bit-map memory means to be displayed.

2. The display system of claim 1 further comprising:

window controller means coupled between said display and said window buffer memory means for controlling a viewing position of said stored image data to be displayed on said display.

3. A display system comprising:

a system bus;

a display device;

a display bit-map means, having a random access port and a serial access port, for storing memory elements corresponding to picture elements of said display, said display bit-map memory means coupled to said display through said serial access port;

window buffer memory means, coupled to said random access port through said system bus and also coupled to said display, for storing image data comprising sentences and graphic charts to be displayed on said display;

window controller means, coupled between said window buffer memory means and said display, for controlling a viewing position of said stored image data to be displayed on said display;

transfer control means coupled to said system bus for controlling transfer of said stored image data from said window buffer memory means to said display bit-map memory means; and selection means coupled to said system bus and said window controller means, for allowing a user to select for operation one of a display mode or a writing mode, wherein in response to said selection means said display system is operable in said display mode wherein said stored image data of said window buffer memory means is transferred and displayed directly on said display overlapping said stored memory elements, and said writing mode wherein said stored image data is transferred by said transfer control means to said display bit-map memory means through said random-access port to be displayed on said display.

* * * * *